Dec. 29, 1959    J. H. DE BOER ET AL    2,919,246
REMOVING CONTAMINATIONS FROM WATER USING
PARAFFIN OIL AND FERRIC CHLORIDE
Filed Sept. 10, 1954

Inventors
de Boer, Jan H. and
de Gelder, Arthur L.
By Cushman, Darby & Cushman
Attorneys

United States Patent Office 2,919,246
Patented Dec. 29, 1959

2,919,246

REMOVING CONTAMINATIONS FROM WATER USING PARAFFIN OIL AND FERRIC CHLORIDE

Jan H. de Boer, Beek, and Arthur L. de Gelder, Stein, Netherlands, assignors to Stamicarbon N.V., Heerlen, Netherlands Application September 10, 1954, Serial No. 455,224

Claims priority, application Netherlands September 14, 1953

5 Claims. (Cl. 210—21)

The invention relates to a process of removing stench-producing substances from water contaminated therewith, in which process a relatively small amount of oil is dispersed in the water, and the oil, now charged with the said substances, is subsequently separated from the water.

The invention can be applied to the purification of water in the widest sense. By way of example mention can be made of the purification of river water—whether or not additionally polluted by the disposal of waste water from residential or industrial activities—with a view to render said water potable.

The stench-producing substances referred to above usually consist of larger or smaller amounts of dissolved substances of an organic origin.

As is known in the art, oils of widely differing compositions, such as fatty oils and mineral oils, are suited for the purpose. The oil is dispersed in the water to be purified and subsequently separated therefrom, the amount of oil used depending on the kind of the oil and on the concentration of the substances to be removed.

In this connection, there have been proposed a number of special measures which, either separately or in combination, may in certain cases bring about an improvement in the effect to be realized:

(1) The oil is dispersed in the water in the dissolved state; this is particularly important when using highly viscous oils.

(2) The oil is previously dispersed in a relatively small amount of water, preferably in a portion of the water to be purified.

(3) The oil is dispersed with the aid of an emulsifying agent; this procedure is especially useful when using mineral or such like oils.

(4) The separation of the oil charged with the stench-producing substances is carried out with the aid of a solid substance finely distributed in the water; said substance may have been formed for example by adding ferric chloride to the water or a similar substance capable of forming a finely distributed solid substance therein, such as a softening agent. The finely distributed solid substance is then separated from the water together with the oil droplets, for example by settling or filtration.

It is the main object of the invention to provide a process of the kind specified in which a very efficient removal of the stench-producing substances is achieved.

A further object of the invention is to provide such process in which initial dissolution of a viscous oil is superfluous.

Another object of the invention is to provide such process in which separate dispersion of the oil in a relatively small amount of water is not necessary.

A still further object of the invention is to provide such process wherein the application of an emulsifying agent for the dispersion of mineral oils may be dispensed with.

A further object of the invention is to provide a simplified process of the kind defined wherein the separation of the oil from the water is carried out with the aid of a substance finely distributed in the water.

Still further objects and the entire scope of applicability of the invention will become apparent from the detailed description and examples given hereinafter, in the annexed drawings and in the appertaining claims. It should be understood, however, that the detailed description is given by way of illustration and not of limitation.

According to the invention the oil is dispersed in the water to be purified by flowing water tangentially into a rotation chamber which has its discharge aperture opened into a body of the water to be purified, which rotation chamber is so shaped and dimensioned that at the feed pressure chosen there is generated in the water in the rotation chamber a strong cyclonic current having a hollow core with a depression therein, the oil to be dispersed being aspirated into said cyclonic current under the influence of said depression.

By the term cyclonic current is understood a stationary rotating current whose tangential velocity component increases according as the radius of rotation decreases; the term rotation chamber denotes a vessel bounded on the inside by a continuous surface of revolution and provided with at least one central discharge aperture and furthermore provided with at least one feed conduit for the water, said conduit being so disposed that at a radius larger than the radius of the discharge aperture(s) a velocity with a relatively high tangentially directed component will be imparted to the inflowing water.

When operating in the manner described above, the oil is extremely finely dispersed in the water by the action of the shearing forces exerted by the cyclonic current. The infed water leaves the discharge aperture of the rotation chamber in the form of a rotating hollow cone laden with minute oil drops. The rotary movement of the effluent water promotes a rapid and thorough distribution of the oil droplets in the body of water to be purified. In connection herewith it is preferred to effect the discharging of the dispersion of the oil in the water below the level of the body of water to be purified.

Preferably, the water flowed into the rotation chamber is at least part of the water to be purified.

The rotation chamber may have various shapes; for example, it may be cylindrical or conical. Preferably the rotation chamber is so constructed as to comprise a cylindrical part, provided with one or more tangentially directed feed conduits for the water, and an adjacent conical part with a discharge aperture centrally arranged in the apex. With this preferred embodiment, and with conical rotation chambers in general—also the apex angle is of importance. An apex angle of 90° or more is preferred.

Furthermore, it has appeared that small rotation chambers, for example those comprising a cylindrical section with an inner diameter of the order of centimeters, produce the best effect. An increase of the diameter makes it necessary to apply a higher pressure in order to obtain oil droplets of the same fineness. Raising the capacity should be realized, therefore, by operating several small rotation chambers in parallel. These rotation chambers arranged in parallel may be combined to form a constructional unit provided with one supply pipe for the water and one feed conduit for the oil.

The oil to be dispersed is preferably supplied to the rotation chamber through a centrally disposed and axially directed feed pipe, which debouches into the rotation chamber at a point opposite the discharge aperture. Said pipe may be extended into the rotation chamber.

In dependence of the feed pressure actually exerted on the water, the shape and dimensions of the rotation chamber are preferably so selected that a definite reproducible depression will be produced in the hollow core of the cyclonic current. The rotation chamber will then act not only as a most effective dispersing apparatus but also as a dosing device for the oil. This is of particular importance in those cases where it is desirable to operate continuously, for example if a continuously flowing body of water has to be purified. In order that a sufficiently large depression can be produced in the core of the cyclonic current in the water, the area of the discharge aperture of the rotation chamber should not be too large relatively to the (total) cross sectional area(s) of the feed conduit(s) for the water.

By applying the present invention, some important advantages are achieved in addition to those mentioned hereinbefore.

(1) The procedure of previously dispersing the oil in water or in a portion of the water to be purified, is now combined with the dispersion of the oil in the body of water to be purified so as to form one single operation.

(2) The application of an emulsifying agent may be dispensed with; for example it has been found possible to obtain excellent results with paraffin oil without using such agent.

By means of the process according to the invention, a special effect could be produced in those cases where the separation of the oil charged with the stench-producing substances is carried out with the aid of a solid substance finely distributed in the water, which substance is formed by adding to the water a substance capable of forming a finely distributed solid substance therein, such as ferric chloride.

According to the invention, a liquid containing such a substance—for example, a solution of ferric chloride in water—may already be supplied to the water whilst it is flowing through the rotation chamber. This does away with the necessity, according to known art, of separately supplying such liquid to the dispersion of the oil in the water to be purified, so that the overall procedure is simplified.

Apparently, and notwithstanding the fact that the said liquid is also thoroughly dispersed by the action of the shearing forces, exerted by the cyclonic current, the length of time needed to form the finely distributed solid substance desired is still long as compared with the short period which, owing to the very good dispersion of the oil in the water, suffices for having the stench-producing substances bound by the oil.

According to the invention, also the above mentioned liquid is aspirated into the cyclonic current in the rotation chamber under the influence of the depression prevailing in the hollow core of said cyclonic current. A very simple mode of performing the process under these conditions, is aspirating the oil and the aforementioned liquid in a roughly mixed state into the cyclonic current through one and the same feed pipe.

Referring now to the drawings.

Figure 1:
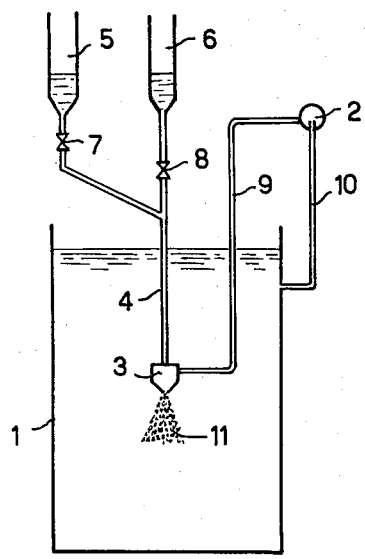
Figure 1 shows a schematic picture of an apparatus in which the process according to the invention can be realized.

In Figure 1, 1 is a reservoir containing a body of water to be purified. A rotation chamber 3, having a tangential feed conduit 9 and a central feed pipe 4, is mounted below the liquid level in said reservoir 1. By means of a pump 2 and a pipe 10, a portion of the water to be purified is flowed under pressure through the pipe 9 and the rotation chamber 3. Via the regulating cocks 7 and 8, the feed pipe 4 connects with the storage tanks 5 and 6 containing oil and a liquid containing a substance capable of forming a finely distributed solid substance in water, respectively.

Figure 2:
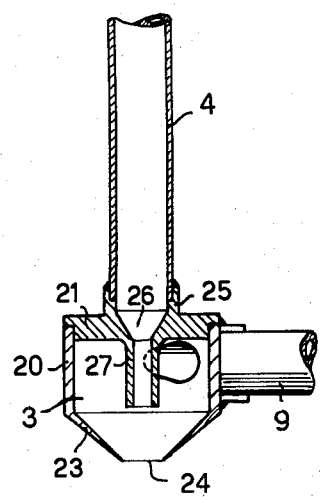
Figure 2 shows a detailed sectional view of the rotation chamber 3 in the apparatus illustrated in Figure 1.

The rotation chamber 3 illustrated in Figure 2 comprises a cylindrical part 20 closed by a plate member 21 and provided with a tangential feed pipe 9, said cylindrical part being connected to a conical part 23 which in its lower end is provided with a central discharge aperture 24. Closure plate 21 of the rotation chamber is provided with a centrally arranged annular projection 25 and a central and conical bore 26 which connects to a central tube 27 extending into the rotation chamber. In the annular projection 25 the feed pipe 4 for the liquids to be dispersed is fixed.

*Example*

Excessively polluted water, obtained by suspending an amount of brook deposit tap water and subsequently allowing it to settle therein, was treated in an apparatus as illustrated in Figure 1. The reservoir 1 had a capacity of 250 litres, the dimensions of the rotation chamber 3 being:

Inner diameter cylindrical part 20_____mm__ 30
Diameter discharge aperture 24_____mm__ 10
Inner diameter feed pipe 9_____mm__ 10
Apex angle conical part 23_____deg__ 90
Inner diameter central tube 27_____mm__ 4
Length central tube 27_____mm__ 14
Height cylindrical part 20_____mm__ 15

The discharge aperture 24 was 12.5 cm. below the level of the water. An amount of 34.7 cm.$^3$ of paraffin oil was brought into reservoir 5 while a solution of 25 g. FeCl$_3$ in 200 cc. of water was brought into reservoir 6. Then, part of the water was forced through the rotation chamber 3 by means of a pump 2 at a feed pressure of 1 atmosphere gauge pressure. When about 5 litres of water had been passed through the rotation chamber, the liquids contained in the reservoirs 5 and 6 had been aspirated and dispersed and the pump 2 was stopped. Owing to the colour of the ferric chloride the spray cone 11 could be clearly observed. The dispersed oil proved to have rapidly spread through the entire volume of water.

It appeared that the strong marshy odour and slight turbidity, which were typical of the original water, could be substantially removed by means of this treatment.

The ferric hydroxide formed settled, together with the oil, in about 2 hours without an appreciable amount of oil appearing on the surface.

Part of the resulting deposit was subjected to a steam distillation. The distillate gave out a most repugnant smell.

A far less favourable result was obtained by a comparative test in which a corresponding amount of paraffin oil, emulsified in water by means of a mixture of sodium alkane sulphonates, was added to the water to be purified under mechanical stirring, whereafter a corresponding amount of ferric chloride was added, likewise under stirring.

This treatment proved to slightly reduce the marshy odour of the water, it is true, though not at the least to a degree as could be achieved by the treatment according to the invention.

Besides, the smell of the distillate obtained by subjecting the deposit to a steam distillation was far less poignant.

Figure 3:
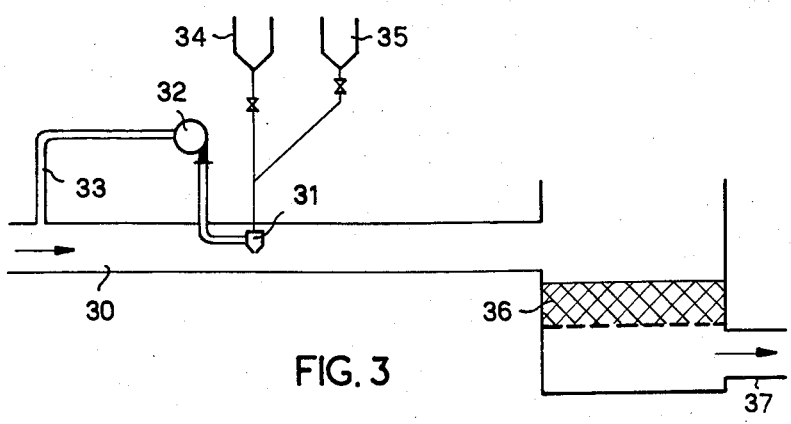
Figure 3 is a schematic diagram of an apparatus used for the continuous purification of current water by means of the invention.

In Figure 3, 30 denotes a pipe through which the water to be purified is flowing, which pipe may, e.g., be part of a drinking water installation. Along the pipe 33, an amount of water is withdrawn from the current in the pipe 30 by means of the pump 32, and subsequently flowed under pressure through the rotation chamber 31. The storage tanks 34 and 35 contain a continuously supplemented amount of oil and liquid containing a substance capable of forming a finely distributed substance in the water. Under the influence of the cyclonic current in the rotation chamber 31, amounts of the two liquids are continuously aspirated and dispersed in the water. At a distance from the rotation chamber, selected with regard to the formation of a deposit and the duration of the purifying process, the pipe 30 debouches over a filter 36 where the water is continuously liberated from deposits and oil, and purified water is continuously carried off along the pipe 37.

We claim:

1. In a process of removing stench-producing substances from water contaminated therewith involving the steps of (1) dispersing a small amount of paraffin oil in said contaminated water; (2) adding to the water an aqueous solution of ferric chloride capable of forming a precipitate therein; and (3) thereafter separating from said water the resulting finely distributed precipitate and oil charged with said stench providing substances, the improvements which comprise simultaneously effecting steps (1) and (2) by flowing water tangentially into a rotation chamber and generating a strong cyclonic current having a hollow core with a depression therein, simultaneously aspirating said oil and said solution into said cyclonic current under the influence of the depression prevailing in the core and subjecting said oil and said solution to the high shearing forces exerted by said cyclonic current whereby said oil and solution are dispersed in the water fed into said chamber, and thereafter discharging the resulting dispersion from said chamber axially of the cyclonic current into a body of the water to be purified, said dispersion being discharged in the form of a rotating hollow cone whereby rapid and thorough distribution thereof in said body of water is effected.

2. A process as claimed in claim 1, wherein at least part of the water to be purified is flowed into the rotation chamber.

3. A process as claimed in claim 1, wherein the discharging of the dispersion of oil in liquid is below the level of the body of the water to be purified.

4. A process as claimed in claim 1, wherein the body of water to be purified is continuously flowing.

5. A process as claimed in claim 1, wherein the oil and solution in the water are aspirated in a mixed state.

References Cited in the file of this patent

UNITED STATES PATENTS

| | | |
|---|---|---|
| 1,406,791 | Werner | Feb. 14, 1922 |
| 1,947,329 | Buttner | Feb. 13, 1934 |
| 1,955,064 | Hawley | Apr. 17, 1934 |
| 1,955,065 | Hawley | Apr. 17, 1934 |
| 2,023,546 | Pumill | Dec. 10, 1935 |
| 2,043,108 | Maurer | June 2, 1936 |
| 2,186,033 | Milton | Jan. 9, 1940 |
| 2,232,727 | Peterkin et al. | Feb. 25, 1941 |
| 2,250,976 | Van Dijck | July 29, 1941 |
| 2,236,930 | Uytenbogaart | Apr. 1, 1941 |
| 2,307,078 | Reed | Jan. 5, 1943 |
| 2,466,842 | Elston | Apr. 12, 1949 |
| 2,761,563 | Waterman | Sept. 4, 1956 |

FOREIGN PATENTS

| | | |
|---|---|---|
| 210,307 | Great Britain | Jan. 31, 1924 |
| 1,048,869 | France | Dec. 24, 1953 |